March 29, 1966 W. N. WITTEBORG 3,243,047
DISPLAY APPARATUS FOR FLAT SURFACE ARTICLES
Filed July 29, 1964 3 Sheets-Sheet 1

INVENTOR.
WILLIAM N. WITTEBORG
BY
ATTORNEYS.

March 29, 1966  W. N. WITTEBORG  3,243,047
DISPLAY APPARATUS FOR FLAT SURFACE ARTICLES
Filed July 29, 1964  3 Sheets-Sheet 2

INVENTOR.
WILLIAM N. WITTEBORG
BY
*Sughrue, Rothwell, Mion, Zinn, & Macpeak*
ATTORNEYS.

March 29, 1966  W. N. WITTEBORG  3,243,047
DISPLAY APPARATUS FOR FLAT SURFACE ARTICLES
Filed July 29, 1964  3 Sheets-Sheet 3
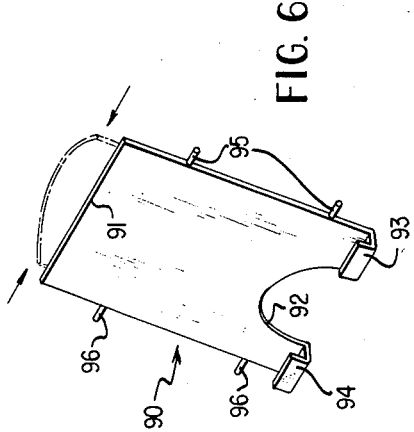
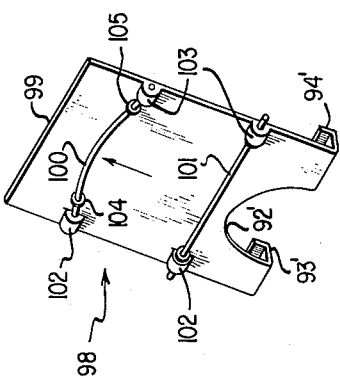
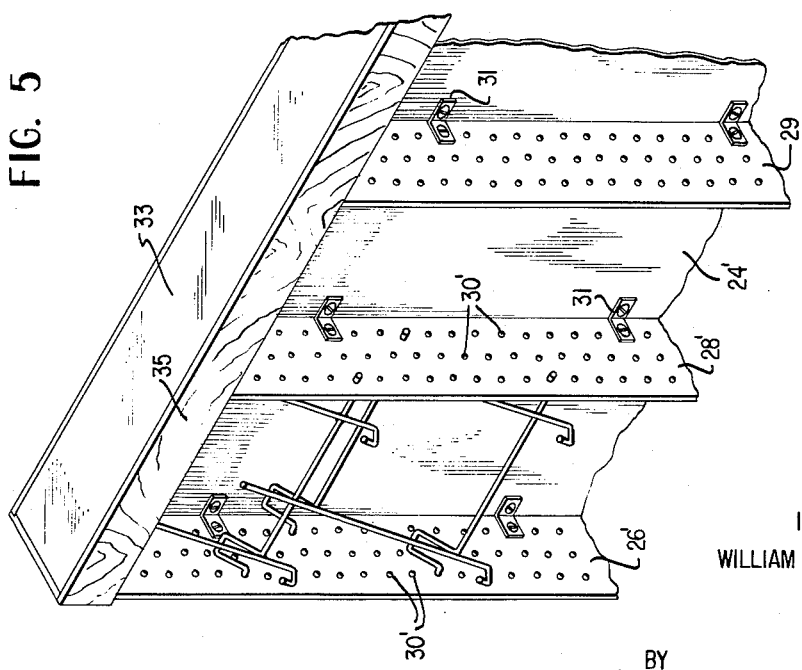
INVENTOR.
WILLIAM N. WITTEBORG
BY
Sughrue, Rothwell, Mion, Zinn & Macpeak
ATTORNEYS.

United States Patent Office 3,243,047
Patented Mar. 29, 1966

3,243,047
DISPLAY APPARATUS FOR FLAT SURFACE ARTICLES
William N. Witteborg, 321 West St., Columbus Grove, Ohio
Filed July 29, 1964, Ser. No. 385,912
4 Claims. (Cl. 211—41)

This invention relates to improvements in display apparatus, particularly display apparatus suitable for holding and displaying the surface of flat generally planar articles.

In the merchandising of generally planar articles such as floor, wall and ceiling tiles, phonograph records and albums, thin boxes of clothing such as hosiery, magazines, post cards, and the like, it is highly desirable and advantageous to display the surfaces of these articles side by side and in comparatively large numbers so that the prospective purchaser can be aided in his selection. In such a display, it is also desirable that the individual flat articles displayed can be easily removed for closer inspection, rearrangement and the like, and further it is advantageous if a display rack for such flat surface articles could handle planar articles having different dimensions. From the standpoint of the merchant, a display apparatus should take up as little floor space as possible, while still displaying the surface of and as many of the products as possible. It is the object of this invention to provide a display apparatus in the form of a rack or the like for flat articles which apparatus takes up a minimum of floor space while being capable of displaying a large number of articles and further having the flexibility of being able to display different articles of different sizes and different amounts of surface of the articles while still being simple and inexpensive in construction.

The foregoing and other objects, features and advantages of the invention will be apparent from the following more particular description of a preferred embodiment of the invention, as illustrated in the accompanying drawings.

In the drawings:

FIGURE 5 is a perspective view of a portion of another embodiment of the display apparatus of this invention.

FIGURE 6 is a perspective view of the front side of another embodiment of the spring clip article holder of this invention.

FIGURE 7 is a perspective view of the rear side of a further embodiment of the spring clip article holder.

Figure 2:
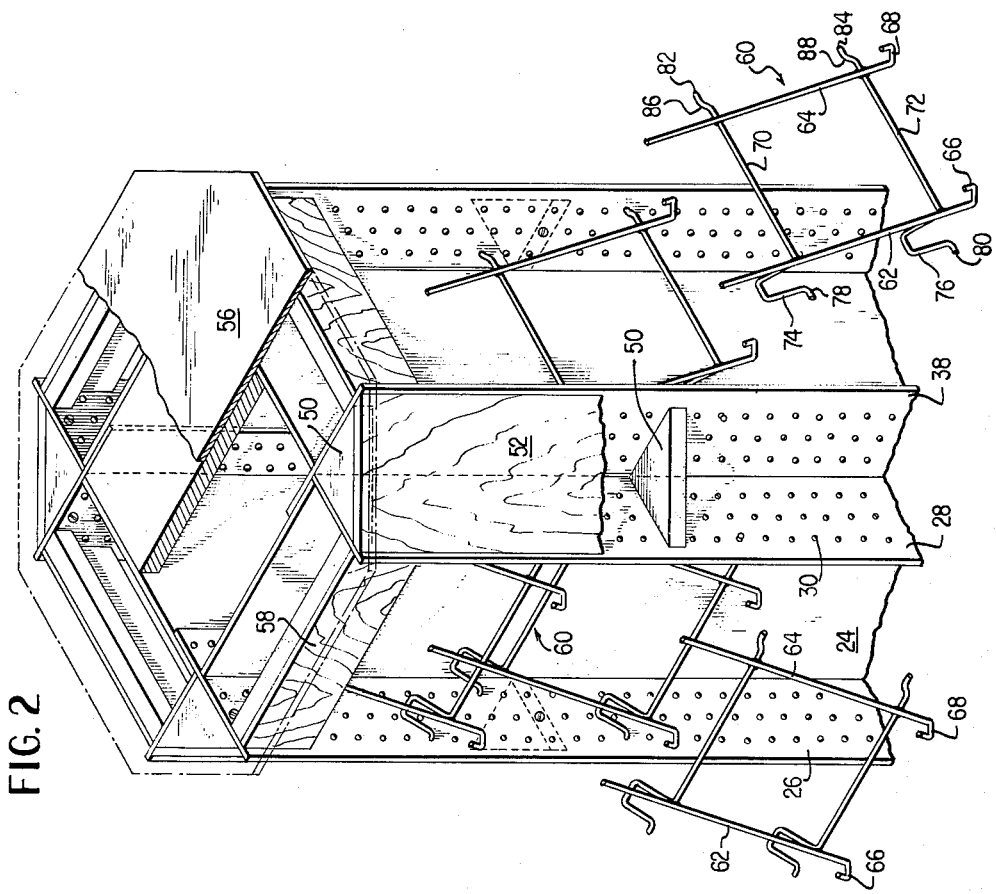
FIGURE 2 is an enlarged perspective view with portions broken away for the sake of clarity of the display rack shown in FIGURE 1.
Figure 1:
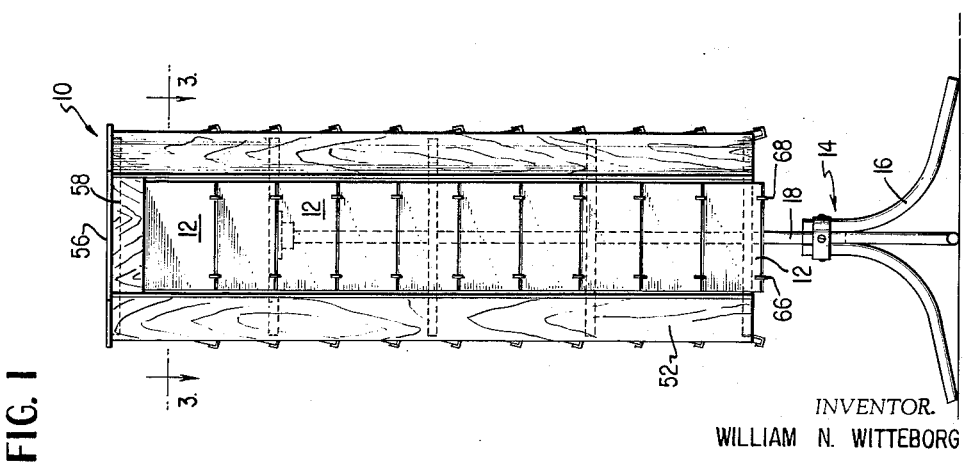
FIGURE 1 is a side elevational view of the display apparatus of this invention showing a number of flat surface articles held and displayed thereby.

The display apparatus 10 of this invention provides an effective and space-saving support for displaying the surface of a large number of flat generally planar articles 12. These articles may be various types of tiles, such as floor, ceiling or wall tiles, or any other type of generally flat articles of commerce, such as phonograph records, hosiery boxes, post cards, magazines and the like.

The display apparatus of the FIGURES 1-4 embodiment includes a support stand 14 having a base 16 and a vertical rod 18 carrying at its top a rotary bearing and bearing plate 20. A horizontal block 22 is attached to the top of bearing plate 20 to support a back wall 24. Although the display apparatus of the FIGURES 1-4 embodiment includes four sides and is rotary to allow inspection of the articles displayed by any side, it is not essential to the inventive concept in its broadest sense that there be four sides because, as shown in the FIGURE 5 embodiment the display rack may have only one side. Other variants are also possible.

The basic elements of the rack include a pair of parallel, spaced apart, side walls or supports 26 and 28 extending at right angles from the back wall 24. These side walls or supports are conveniently made from apertured or perforated board such as Pegboard or the like having a plurality of holes 30 therein for engagement by spring clip article holders to be described in detail hereinafter.

Back wall 24 and spaced parallel side walls of pegboard 26 and 28, form one unit of the display rack. There are, however, three other units making up a four-sided rack. These other units include back walls 32, 34 and 36 as well as perforated board side walls 38, 40, 42, 44, 46 and 48 as shown in FIGURE 3. One of the perforated board side walls of each pair is secured to the horizontal block 22 by nails, screws or the like and the other of each pair is secured to wooden wedge blocks 50 between side walls of adjacent pairs, see FIGURES 2 and 3. A cover member 52 may be then placed over the area between adjacent side walls of each pair to cover the wedge blocks and hide the back of the perforated board.

The top of the four-sided display rack includes a top block 54 covered by a top cap 56 from which depends a mask 58 to mask the view of a portion of the flat article 12 displayed uppermost, and for aesthetic purposes.

FIGURE 5 illustrates a flat display apparatus in accordance with this invention. It includes a back wall 24' to which parallel, spaced apart side walls or supports 26', 28' and 29 are rigidly attached by suitable fasteners, such as screw attached angle brackets 31. Each side wall is preferably formed of perforated hard board having a plurality of holes 30' therein. The display rack may also have a top 33 and a suitable depending face mask strip 35 for the sake of appearance. Since side wall 28' will support spring clip article holders on both sides thereof, extensions on each end of the article holder are offset one row of holes to allow the extensions to be inserted into different holes in the support wall while allowing the holders to be horizontally aligned.

The flat surface articles are held by spring clip holders and these holders in turn are engaged within selected holes 30 in the spaced, parallel, pegboard side walls such as walls 26 and 28. The spring clip may be of the wire rod type (spring clip 60 of FIGURE 2), the flexible plate type (spring clip 90 of FIGURE 6) or the rigid plate with compressible wire spring type (spring clip 98 of FIGURE 7). In all cases the lateral dimension of the spring clip extension must be decreased before the clip can be inserted between the rigid, parallel, spaced apart side walls.

Figure 3:
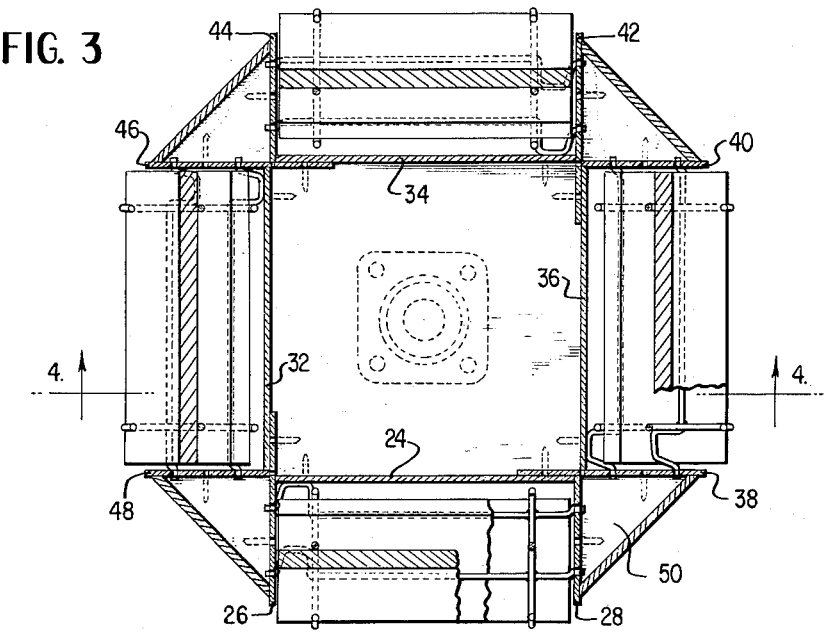
FIGURE 3 is an enlarged sectional view taken along line 3—3 of FIGURE 1.

A wire rod type article holder spring clip 60 is illustrated in some detail in FIGURE 2 and it includes a pair of vertical wire rods 62 and 64 having article holding hooks 66 and 68 formed in the lower ends thereof. Crossing and rigidly attached to the spaced apart vertical wire rods are horizontal wire rods 70 and 72, each formed with U-shaped bends 74 and 76 outside of the vertical rods 62 but slightly in from end extensions 78 and 80 of the horizontal wire rods 70 and 72. These U-shaped bends 74 and 76 effectively form springs which can be compressed to decrease the horizontal dimension of the clip. The other end of the horizontal wire rods 70 and 72 include stop bends 86 and 88 or other effective stop means just inward of the end extensions 82 and 84. The wire rods can be of metal wire or any other suitable material.

In order to insert the spring clip 60 between the spaced parallel side walls, the extensions 78 and 80 are first inserted into a pair of the holes 30 in one of the side walls.

Figure 4:
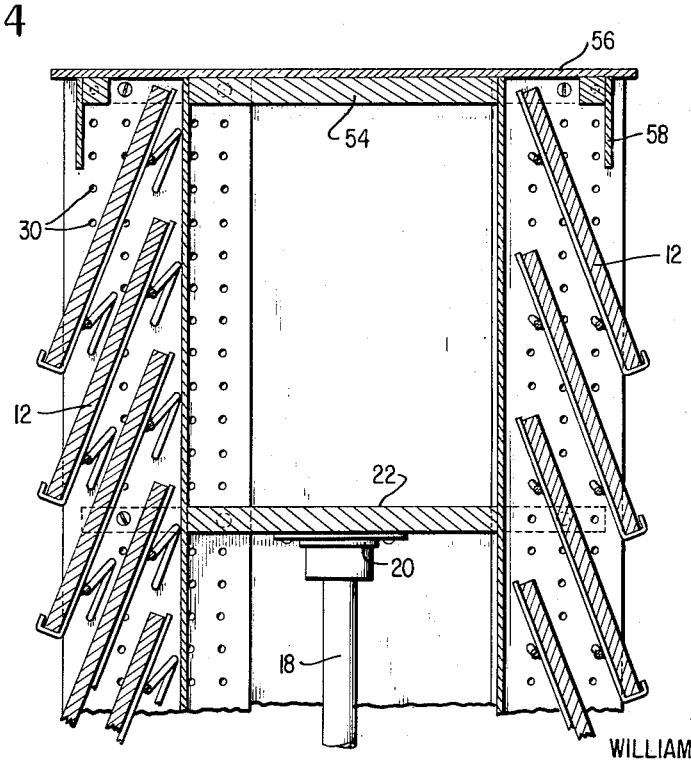
FIGURE 4 is a sectional view taken along line 4—4 of FIGURE 3.

The clip is then compressed by pushing toward the ends 78 and 80 and then forcing the other ends 82 and 84 in between the spaced, parallel, side walls 26 and 28 of perforated board and when they are over holes 30 offset in the next lower row, see FIGURE 4, the force applied to compress the spring bends 74 and 76 is released so that the clips are held firmly in place. The end extensions 82 and 84 will extend into holes 30 under the force of springs 74 and 76 up to the limit of stops 86 and 88.

The spring clip article holder 90 of FIGURE 6 is constructed with a solid flexible body 91 of suitable, thin flexible material such as metal, plastic, etc., and it includes a hand hold relieved portion 92 and upturned article holding legs 93 and 94. The outer faces of these legs may carry suitable labels or identification tags. Extensions 95, 96 protrude from the edges of body 91. These extensions could be a part of body 91 or they could be separate elements secured to body 91; they could also be directly opposite one another laterally as shown or laterally offset as in the wire spring clip 60. For installation and removal the body 91 is bowed as shown in FIGURE 6 to shorten the distance between extensions 95 and 96.

The spring clip article holder 98 of FIGURE 7 is constructed of suitable rigid and solid material with a plate body 99 hand hold 92' and upturned article holding legs 93' and 94'. A pair of flexible wire rods 100 and 101 each extend through bosses 102 and 103 to provide the extensions of engaging in holes 30 of the side supports. Each flexible rod carries suitable shoulder stops 104 and 105 to center the rod and the extensions. To shorten the lateral dimensions of the extensions the flexible rods are moved in any direction, as shown on rod 100 in FIGURE 7. This allows the article holder to be inserted between the spaced parallel rigid side walls.

Obviously, the clips can be easily removed and this is highly advantageous to allow display of different sized articles, and to allow different amounts of the surface of articles to be displayed. In other words, the brackets can be moved up and down vertically within the pegboard side walls to show different amounts of the same size tiles, or to hold different size tiles or other items of merchandise. The bearing plate 20 allows the four-sided rack to be rotated as desired. The hooks 66 and 68 and legs 93, 94, 93', 94' of the various spring clips support the flat surface articles 12 resting therein by gravity and the articles can easily be removed by moving them upward to allow them to come free of the support hooks.

While the invention has been particularly shown and described with reference to preferred embodiments thereof, it will be understood by those skilled in the art that the foregoing and other changes in form and details may be made therein without departing from the spirit and scope of the invention.

I claim:

1. A spring clip article holder for use with an apertured board type support rack having spaced apart parallel apertured boards, the holder comprising; at least two spaced apart generally vertical wire rods including hooks formed in their lower ends for supporting the flat surface articles, at least two spaced apart generally horizontal wire rods attached to the vertical rods and extending beyond the vertical rods to provide extensions for engaging holes in the spaced apart parallel apertured boards, the horizontal wire rods including a U-shaped bend forming a spring in one end thereof beyond the point of attachment to the vertical rods to allow a horizontal dimension of the holder to be decreased by compressing the U-shaped bend to allow the holder to be inserted between the spaced apart parallel apertured boards, and the other end of the horizontal wire rod including a stop adjacent thereto.

2. A display apparatus for flat surface articles and the like comprising; a stand including a rotary bearing, a display rack having four vertical back walls supported for rotary movement from a rotary bearing, the four walls positioned at right angles to each other, four pairs of spaced apart side support perforated boards, each pair extending at right angles from one of the four back walls and secured thereto, and a plurality of spring clip flat surface article holders, each article holder comprising at least two spaced apart generally vertical wire rods including hooks formed in their lower ends for supporting the articles, at least two spaced apart generally horizontal wire rods rigidly attached to the vertical rods and extending beyond the ends of the vertical rods to provide extensions for engaging holes in the perforated board side supports, the horizontal wire rods including U-shaped bends adjacent one end thereof for forming a spring means to allow a horizontal dimension of the holder to be decreased by compressing the U-shaped bend whereby the holder is mounted between the spaced apart perforated board side supports.

3. A display apparatus for flat surface articles and the like comprising; a back support means, a pair of parallel, spaced apart, vertical side supports carried by the back support means, means defining a plurality of holes in the side supports, and at least one spring clip flat surface article holder of the wire rod type including at least two spaced apart, generally vertical wire rods having hooks formed in their lower ends, and at least two spaced apart, generally horizontal wire rods attached to the vertical rods and extending beyond the vertical rods to provide extensions for engaging the holes in both side supports, the horizontal wire rods including spring means provided by a U-shaped bend in at least one end of each rod beyond the point of attachment to the vertical rods to thereby allow a horizontal dimension of the holder to be decreased by squeezing the spring means to allow the holder to be inserted in the holes in the spaced apart side supports.

4. A display apparatus for flat surface articles and the like comprising; a support means, a pair of rigid, parallel, spaced apart, vertical side supports carried by the support means, means defining a plurality of holes in each of the side supports, a spring clip article holder including a resilient, flexible, sheet-like body member, article holding means for holding flat articles resting on the article holder, rigid lateral extensions protruding from both sides of resilient sheet-like body member and engageable with the holes in the side supports, the resilient sheet-like body member allowing a reduction in the lateral dimension between the ends of the rigid lateral extension to allow the article holder to be installed in and removed from the side supports by bowing the flexible sheet-like member.

References Cited by the Examiner

UNITED STATES PATENTS

| 1,997,829 | 4/1935 | McKee | 211—55 |
| 2,172,881 | 9/1939 | Swedman | 108—6 |
| 2,367,289 | 1/1945 | Kollman | 211—88 |
| 2,784,847 | 3/1957 | Holroyd | 211—55 |
| 2,884,221 | 4/1959 | Messier | 248—361 |
| 2,923,417 | 2/1960 | Sonksen | 211—165 |
| 3,123,220 | 3/1964 | Hanson | 211—88 |

FOREIGN PATENTS 712,658    7/1954    Great Britain.

CLAUDE A. LE ROY, *Primary Examiner.*

W. D. LOULAN, *Assistant Examiner.*